(12) United States Patent
Sugizaki (10) Patent No.: US 8,820,740 B2
(45) Date of Patent: Sep. 2, 2014

(54) SHEET CONVEYING APPARATUS (71) Applicant: Toshiba Tec Kabushiki Kaisha, Tokyo (JP)

(72) Inventor: Yoshiaki Sugizaki, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/858,877

(22) Filed: Apr. 8, 2013

(65) Prior Publication Data

US 2013/0264769 A1    Oct. 10, 2013

Related U.S. Application Data

(60) Provisional application No. 61/622,441, filed on Apr. 10, 2012.

(51) Int. Cl.
*B65H 5/00*    (2006.01)

(52) U.S. Cl.
USPC ........................................... 271/264; 399/124

(58) Field of Classification Search
CPC ..................... B65H 2402/45; B65H 2402/441; B65H 5/36; G03G 21/1623; G03G 21/1633; G03G 21/1638; G03G 2215/00544
USPC ........................................... 271/264; 399/124
See application file for complete search history.

(56) References Cited

U.S. PATENT DOCUMENTS 5,122,841 A * 6/1992 Sasaki ........................... 399/124

FOREIGN PATENT DOCUMENTS

| JP | 2005-031377 | 2/2005 |
| JP | 2009-232194 | 10/2009 |

OTHER PUBLICATIONS

U.S. Appl. No. 13/294,728, filed Nov. 11, 2011, Toshiaki Oshiro et al., 28 pages.
U.S. Appl. No. 13/486,769, filed Jun. 1, 2012, Ken Iguchi et al., 75 pages.

* cited by examiner

*Primary Examiner* — Michael McCullough
(74) *Attorney, Agent, or Firm* — Patterson & Sheridan LLP (57) ABSTRACT

According to one embodiment, a link member is arranged on a conveying path where a sheet is conveyed in a direction substantially perpendicular to an access door. In conjunction with the opening operation of the access door, the link member is raised. On the raised portion of the link member, an upper side conveying guide has one side supported in a free rotatable way and forms a portion of the upper side of the conveying path where the sheet is conveyed in the direction substantially perpendicular to the access door. By interlocking with the opening operation of the access door, the link member is raised, and the upper side conveying guide is opened.

20 Claims, 9 Drawing Sheets

SHEET CONVEYING APPARATUS

CROSS-REFERENCE TO RELATED APPLICATION

This application is based upon and claims the benefit of priority from U.S. Provisional Patent Application No. 61/622,441, filed Apr. 10, 2012; the entire contents of which are incorporated herein by reference.

FIELD

Embodiments described herein relate generally to a sheet conveying apparatus having a curved conveying path so that the horizontal direction and the descending direction are connected with each other midway along the sheet conveying path.

BACKGROUND

In order to simplify the process for clearing a paper jam, the following scheme has been proposed: Upon opening of the cover, a manual sheet feeding apparatus interconnected to the cover or cover opening mechanism is retracted from a pair of guide rollers in a portion of a sheet conveying path, and the pair of guide rollers is moved to an open or separated state. As a result, there is no need to perform an additional operation of opening the sheet guide pair and retracting the manual sheet feeding apparatus. Therefore, fewer steps are performed for opening the conveying path and the handling of a paper jam is simplified.

In this arrangement, the sheet guide pair, forming a part of the cover and the conveying path, is arranged in a position substantially parallel to the cover. Therefore, it is difficult to link the opening/closing of a conveying guide, which forms a part of the conveying path which flows in a direction orthogonal to the cover. Consequently, the conveying guide, arranged substantially in the direction perpendicular to the cover, requires a separate opening/closing operation than the opening/closing operation of the cover. Inevitably the operation for opening the conveying path for handling a paper jam, etc., becomes complicated.

DETAILED DESCRIPTION

According to one embodiment, a sheet conveying apparatus has an access door, a conveying path, a first guide, and a linkage member. The access door has one end thereof supported on the side surface of a main body in a freely opening way, i.e., about a hinge. The conveying path within the housing of the sheet conveying apparatus conveys a sheet in a direction generally parallel to, and then away from, the access door when the access door is in a closed position. When the door is in the closed position, a first conveying guide has one end portion thereof located over the conveying path to form a portion of the conveying path, and the other end portion is supported on the door by a hinge, in a freely rotatable way with respect thereto. A link member is connected to the first conveying guide and the access door to enable the free rotation of the guide with respect thereto. The linkage member is configured and arranged to move the first conveying guide about a hinge connection to move the first conveying opening closing member from a position overlying to sheet flow path to a position where the first conveying guide is swung away from the sheet flow path as the door is moved from the closed to the open position.

Hereinafter, embodiments will be explained in with reference to the drawings.

(First Embodiment)

Figure 1:
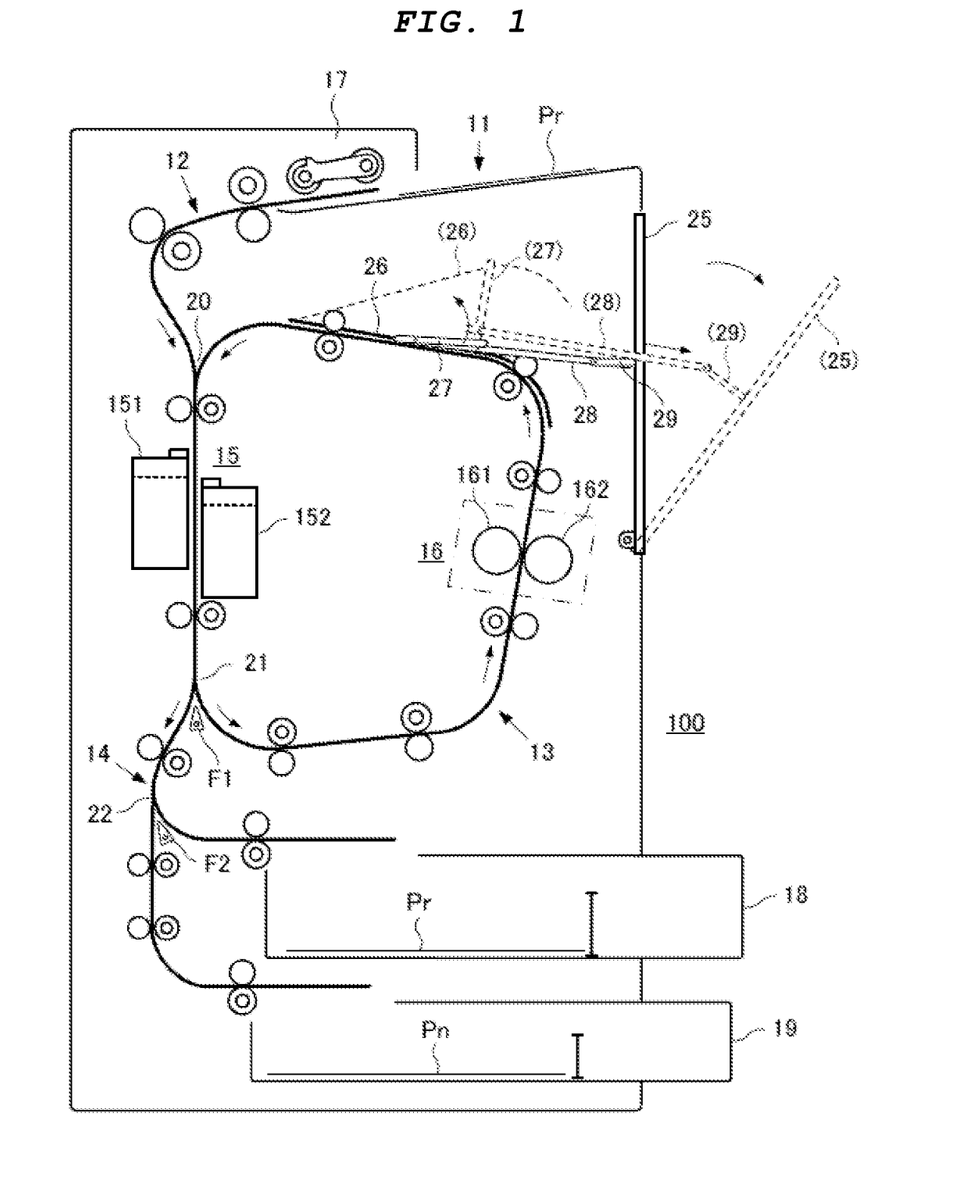
FIG. 1 is a schematic diagram illustrating a first embodiment of a sheet conveying apparatus.

FIG. 1 is a schematic diagram illustrating a first embodiment of a sheet conveying apparatus. Here, an image erasing apparatus 100 is presented as an example of the sheet conveying apparatus. This image erasing apparatus has the function of de-coloring an image by application of heat to a printed matter.

The image erasing apparatus 100 uses heat to erase an image printed on a sheet Pr using a de-colorable coloring material. When heated to a prescribed temperature, chemical reactions take place to erase the color of the de-colorable coloring material. The sheet developed using the de-colorable coloring material can be erased and reused by heating the de-colorable coloring material.

The image erasing apparatus 100 includes a sheet feeding section 11, a sheet feeding path 12, a circulating conveying path 13, a discharged sheet conveying path 14, an image read scanner section 15, a print erasing section 16, discharged sheet trays 18, 19, etc. Here, the sheet feeding path 12, the circulating conveying path 13 and the discharged sheet conveying path 14 shown in FIG. 1 are illustrated as a single line in an end view thereof. However, the configuration uses guide plates arranged facing each other to guide the outer surface and inner surface of the sheet Pr while conveying the sheet in the path.

The sheet Pr, having an image formed thereon by a de-colorable coloring material to be erased by heating thereof, is loaded in the sheet feeding section 11.

A sheet on the sheet feeding section 11 is fed into the sheet feeding path 12 by an auto loading device 17, or the like. The sheet feeding path 12 is a conveying path for feeding the sheet Pr to a working section for erasing the image. The fed sheet Pr is conveyed along sheet feeding path 12 to a connected next-stage.

The circulating conveying path 13 receives the sheet Pr fed in from the sheet feeding path 12 and circulates the sheet Pr in a counter-clockwise direction as shown in the drawing. The circulating conveying path 13 and the sheet feeding path 12 are connected at a merging section 20 formed downstream from where the sheet Pr descends into a vertical direction.

Discharged sheet conveying path 14 branches from the circulating conveying path 13 at a branching section 21 from which a discharged sheet conveying path 14 which selectively discharges sheet Pr to the discharged sheet tray 18 or 19 and a circulating conveying path 13. Sheet Pr, circulating on discharged sheet conveying path 14, and a circulating conveying path 13 Sheet Pr, circulating on discharged sheet conveying path 14, is discharged via branching section 22 to the discharged sheet tray 18 or 19. The discharged sheet tray 18 accommodates, for example, sheet Pr in A4 size format. The discharged sheet tray 19 accommodates, for example, sheet Pr in a different size format, for example A3.

First scanner section 151 and a second scanner section 152, of the image read scanner section 15 are located between merging section 20 and branching section 21 of the conveying path, and they read print information of the sheet Pr detect whether an image is present on the sheet Pr.

The first scanner section 151 scans and reads the print information on one surface of sheet Pr. The first scanner section 151 then converts the read information to electronic data and determines whether the sheet is "blank", and where the sheet has travelled through the print erasing section 16, whether toner remains visible on the one surface of sheet Pr. The first scanner section 151 has a CCD (Charge Coupled Device) sensor, arranged at the position symmetric to the one surface of sheet Pr, for detecting image elements on the sheet Pr.

The second scanner section 152 scans and reads the print information on the second surface of sheet Pr, converts the read information to electronic data, and determines whether the toner remains visible on the second surface of sheet Pr. The second scanner section 152 has a CCD (Charge Coupled Device) sensor, arranged at the position symmetric to the second surface of sheet Pr, as an image reading element.

In one embodiment, the first scanner section 151 and the second scanner section 152 utilize CCD sensors to obtain an image of the sheet Pr for reading the status of print information thereon. However, this is merely an example. In another embodiment, the first scanner section 151 and the second scanner section 152 use CMOS (Complementary Metal Oxide Semiconductor) sensors as the imaging the imaging elements.

The print erasing section 16 has heaters 161, 162 that heat the sheet Pr to a prescribed temperature to discolor the toner formed on the sheet Pr read by the first scanner section 151 and the second scanner section 152. The heaters 161 and 162 are arranged so they can heat the two surfaces of conveyed sheet Pr.

The discharged sheet tray 18 may accommodate the reusable sheets Pr, whereas the discharged sheet tray 19 may accommodate non-reusable sheets Pn.

Sheet feeding path 12, the circulating conveying path and the discharged sheet conveying path 14 include conveying rollers, conveying belts, etc. The sheet Pr, fed from the sheet feeding section 11, is conveyed by sheet feeding path 12 to the first scanner section 151 and the second scanner section 152. Sheet Pr is then conveyed by the circulating conveying path 13 to the print erasing section 16, and thence back through the scanner section 15. Thereafter, the sheet Pr is conveyed on discharged sheet conveying path 14 to discharged sheet tray 18 or discharged sheet tray 19, based up whether the sheet is reusable or not reusable (erased or not erased/not erasable).

A first flipper F1, arranged at the branching section 21, determines whether sheet Pr is to be conveyed to circulating conveying path 13 or discharged sheet conveying path 14. Also, discharging sheet Pr to discharge sheet tray 18 or to discharge sheet tray 19 is determined by rotating a second flipper F2 arranged at branching section 22. The first flipper F1 and the second flipper F2 swings clockwise or counter-clockwise on the basis of a control signal from a control section not shown in the drawing.

The control section positions the first flipper F1 based on the detection by the scanner section 15 of 15 of whether the toner formed on the sheet Pr has been discolored by the print erasing section 16. Upon determining the image on sheet Pr has not been discolored, the first flipper F1 is swung counter-clockwise so sheet Pr may be sent to the print erasing section 1616 for the first time, or a repeated time, to erase the image thereon. When it is determined that the image has been de-colored or erased, the first flipper F1 is swung in a clockwise direction to convey sheet Pr to the discharged sheet conveying path 14.

Although the erasing operation has been carried out and the image on the sheet Pr is determined to not be discolored, the control section swings the first flipper flipper F1 in a clockwise direction to convey sheet Pr to the side of the discharged sheet conveying path 14. The number of rounds for passing through the print erasing section 16, when it is determined that the image is not discolored, can be set at will.

The second flipper F2 swings in a clockwise or counter-clockwise direction on the basis of whether the sheet Pr can be reused. When it is determined that the image on the sheet Pr has been de-colored and can be reused, the second flipper F2 is swing counter-clockwise, and the reusable sheet Pr is conveyed to discharged sheet tray 18. When a sheet Pr is determined to not be de-colored, the second flipper F2 swings clockwise, and conveys sheet Pr to discharged sheet tray 19 as a non-reusable sheet Pn.

Arranged on the right hand side surface of the main body, of the image erasing apparatus 100, is an access door 25 that swings freely about a shaft/hinge arrangement on the lower portion of the access door 25. The access door 25 is used to access the conveying path to remove a paper jam which took place in the region of the upper side of circulating conveying path 13, or from the lower side to the upper side of circulating conveying path 13.

Figure 2:
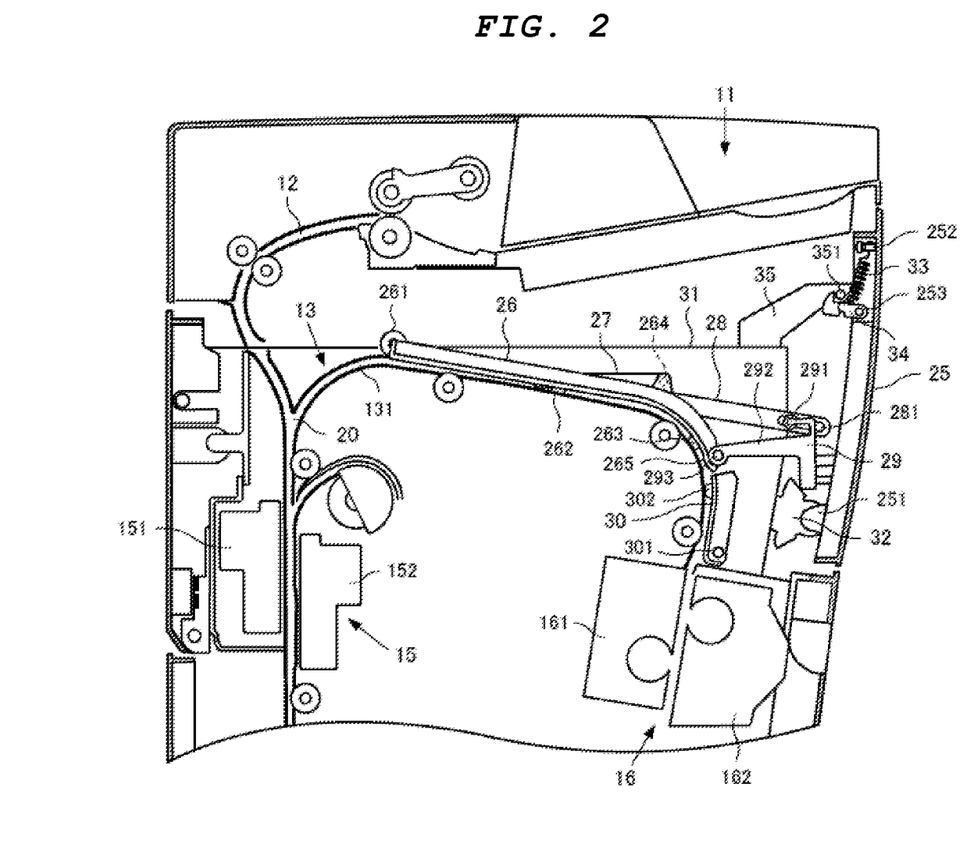
FIG. 2 is a front view illustrating an upper portion of FIG. 1 in a state where the access door is closed.
Figure 3:
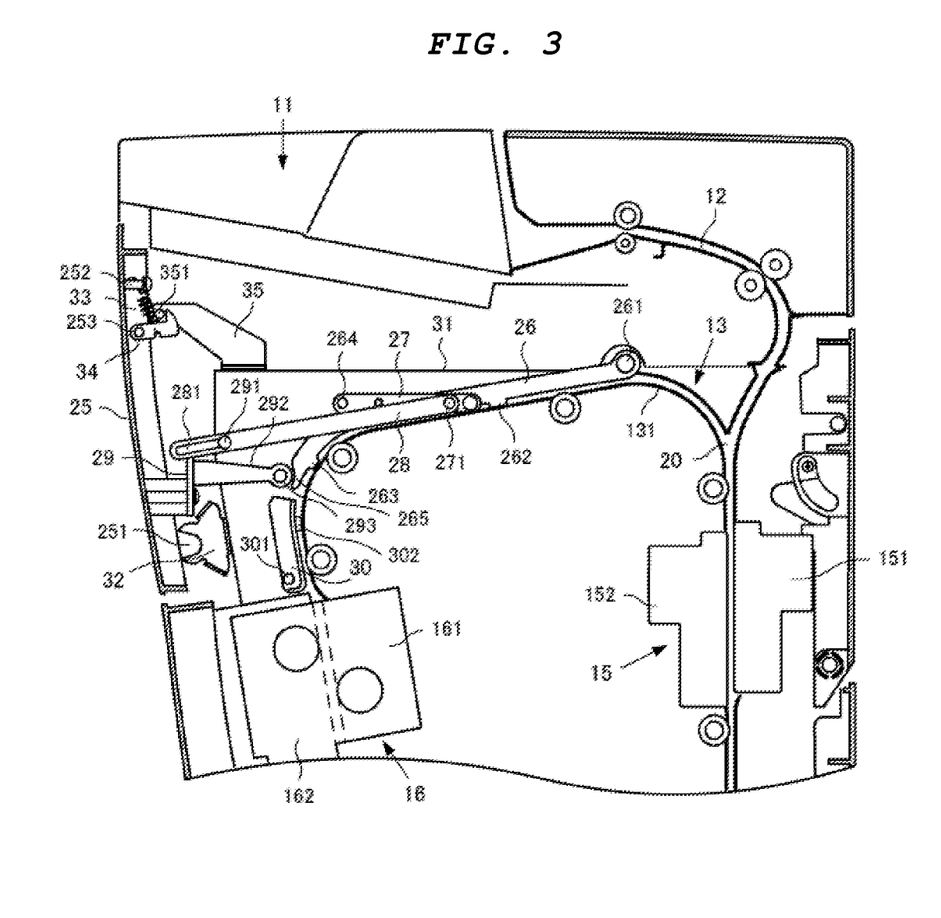
FIG. 3 is a view of the sheet conveying apparatus that is from the other side of the sheet conveying apparatus relative to the view of FIG. 2.

FIG. 2 is an enlarged view illustrating in detail the upper portion shown in FIG. 1. FIG. 3 is a view of the sheet conveying apparatus that is from the other side of the sheet conveying apparatus relative to the view of FIG. 2.

An upper side conveying guide 26, as a first conveying guide, receives the sheet Pr rising from the lower side of the apparatus adjacent to the access door 25. The upper side conveying guide 26 provides the outer portion of the circulating conveying path 13 for guiding sheet Pr in the upper portion of the circulating conveying path 13. Together with an inner side guide 131, the upper side conveying guide 26 forms a portion of the circulating conveying path 13. When the upper side conveying guide 26 is closed for conveying sheet Pr, it is arranged substantially perpendicular to the closed access door 25.

The upper side conveying guide 26 is supported around a shaft 261 such that it may be swung in an arc thereabout. The upper side conveying guide 26 has spacers 262 and 263 formed on the lower side thereof, in a location offset from the paper conveying path such that they do not hamper the conveyance of the sheet Pr on the surface opposite to the inner side guide 131. The spacers 262 and 263 establish the spacing of the upper side conveying guide 26 with respect to the inner side guide 131, and this establish the width dimension of the circulating conveying path 13 there past.

A supporting portion 264 is formed near the bend of the upper side conveying guide 26. A first link 27 is supported in a free rotatable way on the supporting portion 264. The other side of the first link 27, while in contact with a portion of the inner side guide 131, is supported in a free sliding manner on the inner side guide 131 at a location outside of the paper transport path.

The other side of the first link 27 is connected in a freely rotatable way by a shaft 271 (FIG.) to one end of a second link 28 as shown in FIG. 3. The other end of the second link 28 has a slot 281 formed thereon. The slot 281 is engaged with a first arm 291 or shaft of a link arm 29 extending within and slidable in the slot 281.

A link arm 29 is attached to the access door 25 made of, for example, a resin. The link arm 29 also has a second arm 292 formed monolithically therewith. A hole 293 is formed at the tip of the second arm 292. The tip of the second arm 292 engages a tip portion 265 of the upper side conveying guide 26. The tip portion 265 of the upper side conveying guide 26 is somewhat pressed the tip of the second arm 292 with an elastic force provided from the tip of the second arm 292 on the hole 293.

A conveying guide 30 is arranged as a second conveying guide on the line extended from the tip portion 265 of the upper side conveying guide 26. The conveying guide 30 is arranged on the outer side of the circulating conveying path 13 where sheet Pr is conveyed from the lower side to the upper side of the apparatus. The conveying guide 30 is arranged in a position substantially parallel with the access door 25 when closed.

The conveying guide 30 is supported on a lower portion thereof by a shaft 301 so that it can be closed in a first position, where the sheet Pr can be conveyed, and opened in a second position, where the sheet Pr is exposed for removal. Shaft 301, for conveying guide 30, and shaft 261, for upper side conveying guide 26, are attached at opposing ends, far from each other. As a result, a large opening is formed in the circulating conveying path 13 between shaft 301 to shaft 261 when opening the conveying guide 30 and the upper side conveying guide 26.

When the conveying guide 30 is in the first position, it is held by a holding mechanism not shown in the drawing. For example, the holding mechanism can be realized by a configuration in which a hole is formed on one side and an elastic member attached on the other side engages with the hole.

At the position opposite shaft 301 of the conveying guide 30 offset from to the inner side guide 131, a spacer 302 is formed at a position without hampering conveying of sheet Pr. The spacer 302 is provided for establishing the width dimensions of the circulating conveying path 13.

The access door 25 has a shaft 251 arranged on the lower inner side. Shaft 251 is supported on a bearing 32 attached to a chassis 31 in a manner such that access door 25 can be opened/closed freely. Arranged on the upper side of the access door 25 is an engagement pin 252 attached on one end of a spring 33. The other end of the spring 33 is attached to a key portion 34 supported in a free rotatable way by a shaft 253 attached on the lower side below the engagement pin 252. The key portion 34 is energized by the action of the spring 33 to be biased to swing in a clockwise manner.

The energizing force of spring 33 engages key portion 34 with a locking shaft 351 of a supporting member 35 attached on the chassis 31. The engagement of the key portion 34 with the locking shaft 351 can be released by swinging the key portion 34 counter-clockwise about shaft 253 against the energizing force of the spring 33. A lever operation can open the access door 25 by discharging a releasing key portion 34 from the locking shaft 351, by interlocking a lever not shown in the drawing and the key portion 34. The access door 25 may also be energized in the releasing direction so that the access door 25 can be released by the lever operation.

Figure 4:
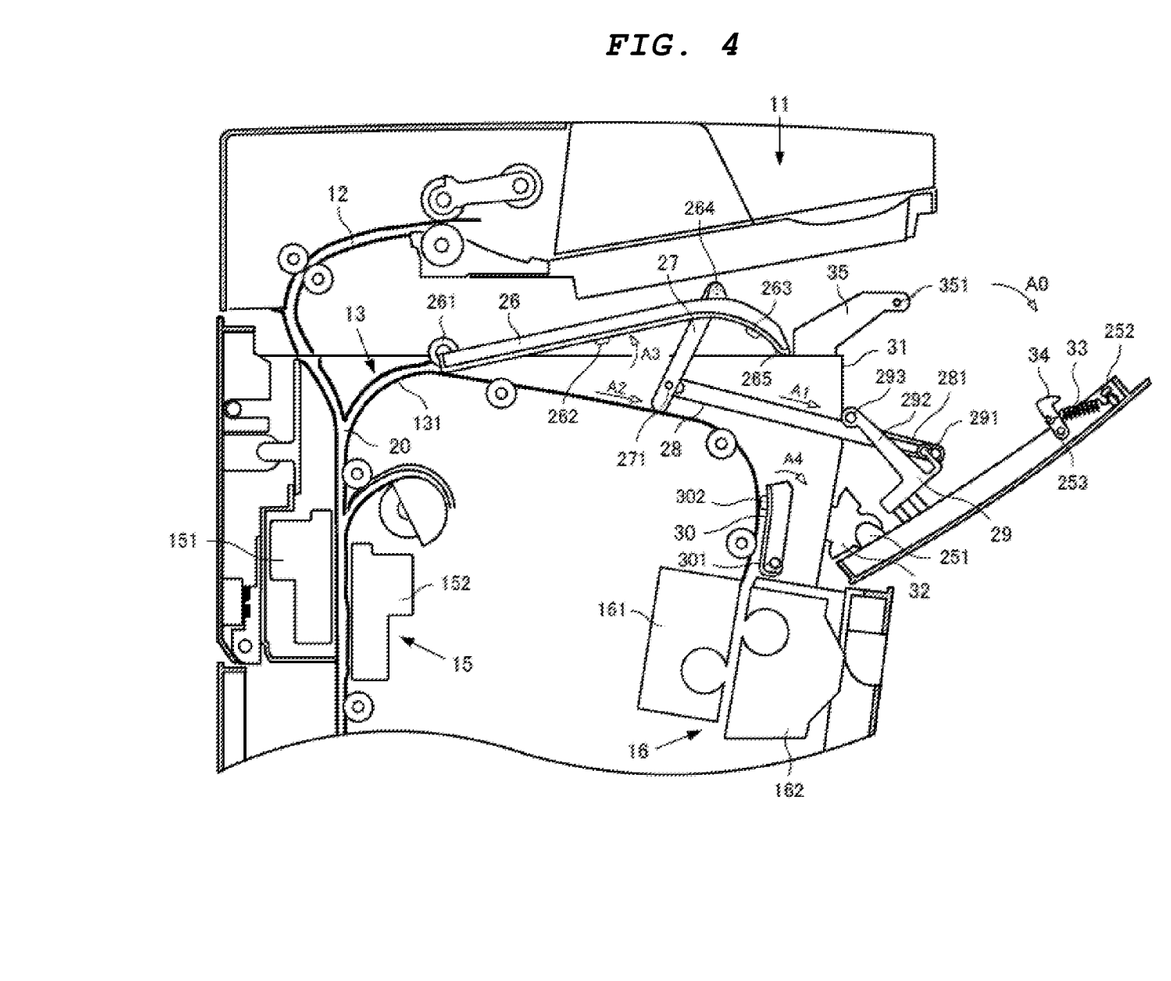
FIG. 4 is a front view illustrating an upper portion of FIG. 1 in a state in which the access door is opened.
Figure 5:
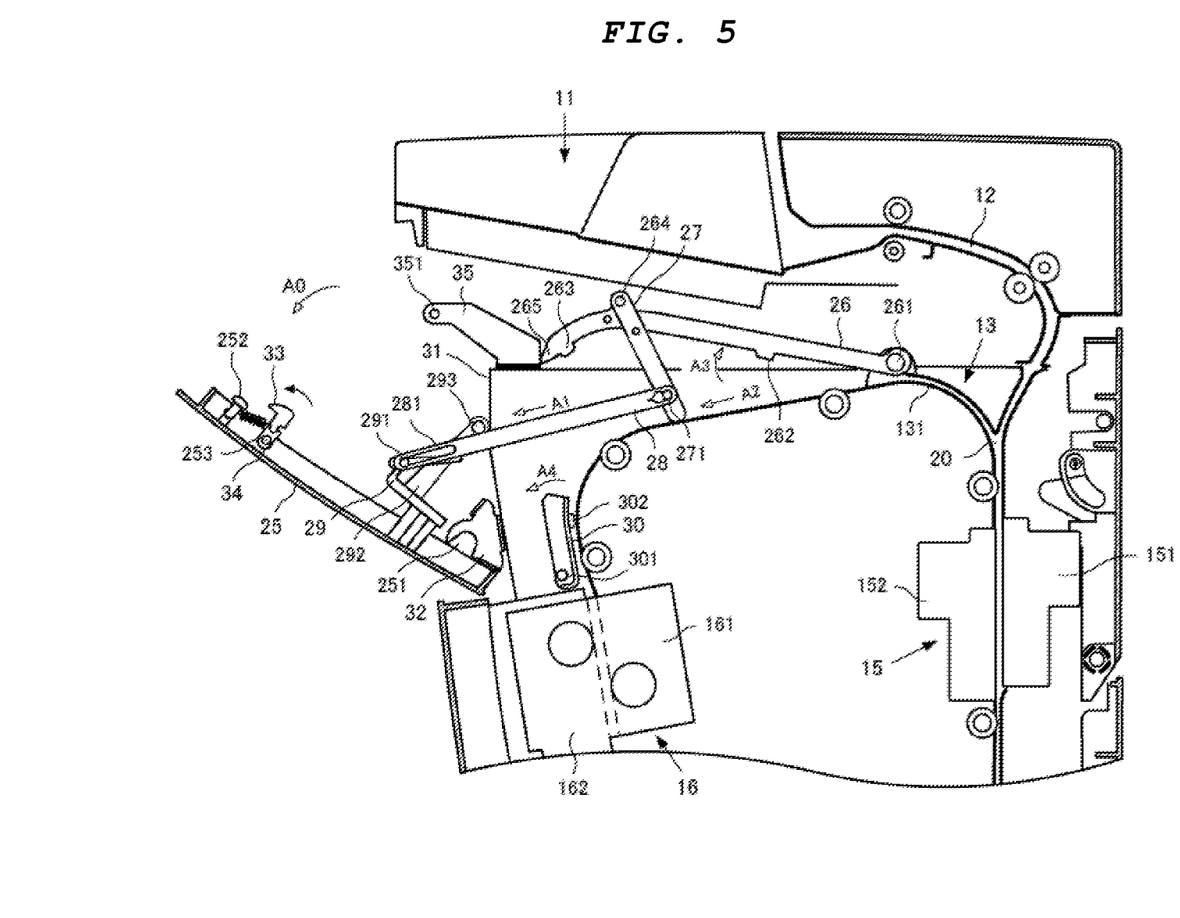
FIG. 5 is a back view of FIG. 4.

In the following, the operation of this embodiment will be explained with reference to FIGS. 4 and 5. Here, FIG. 4 is a front view illustrating the state in which the access door 25 shown in FIG. 2 is opened. FIG. 5 is a back view illustrating the state in which the access door 25 shown in FIG. 3 is opened.

The key portion 34 is driven to move counter-clockwise when the lever interlocked to the key portion 34 is manipulated. Access door 25 is opened in the direction indicated by arrow A0, shown in FIGS. 4 and 5, once key portion 34 releases the engagement with locking shaft 351. The first arm 291 of the link arm 29 moves in the slot 281 of the second link 28 in company with the opening of the access door 25.

Upon an initial (partial) opening of access door 25, the second link 28 does not move in the longitudinal direction indicated by arrow A1 when the first arm 291 moves from one end of the slot 281 to the other end of the slot 281. Additionally, the tip portion 265, of the upper side conveying guide 26, is released under the pressure from the second arm 292. As the access door 25 is opened beyond the partial opening, the first arm 291 contacts the end of slot 281 and engages second link 28. The second link 28 moves in the longitudinal direction indicated by arrow A1 in FIGS. 4 and 5 as the access door 25 is further opened from this state.

The first time period while the first arm 291 moves in the slot 281 is different from the second time period while the first arm 291 engages the end of slot 281 in the opening operation of the access door 25, thus creating a lost motion connection. The lost motion connection contributes to an improvement in the operability of opening as it decreases the load or energy needed to start of opening the access door 25. Also, by having a lost motion connection, it enables the engagement/disengagement between the key portion 34 of the access door 25 and the locking shaft 351.

In company with the movement of the second link 28 in the direction indicated by the arrow A1, the first link 27 connected to the second link 28 moves along the inner side guide 131 in the direction indicated by an arrow A2 shown in FIGS. 4 and 5. In company with this movement, the first link 27, connected to second link 28, swings around shaft 271 as an axis. The rotation around shaft 271 places the first link 27 in a raised state.

In company with the raised state of the first link 27, supporting portion 264, swung around shaft 261 in the direction indicated by an arrow A3 shown in FIGS. 4 and 5, raises the upper side conveying guide 26.

The conveying guide 30, rotatable around shaft 301, is released from the state in which the hole on one side is engaged with the elastic member on the other side as it is manipulated in the direction indicated by an arrow A4 in FIGS. 4, 5. As a result, the opening region of circulating conveying path 13 becomes even wider.

When the access door 25 is closed, the link arm 29, the second link 28, and the first link 27 act in a reverse manner. The first link 27 descends from the raised, so that the upper side conveying guide 26 is closed, and the sheet can be conveyed.

In this way, in company with the opening and closing of the access door 25, the upper side conveying guide 26, arranged substantially in the direction perpendicular to the access door 25, can be opened and closed. The circulating conveying path 13, at the region guided by the upper side conveying guide 26, is opened as the upper side conveying guide 26 is opened. Carrying out this operation easily releases or exposes jammed paper in those cases where a jam takes place in this region of the circulating conveying path 13.

The upper side conveying guide that forms a portion of the upper side of the circulating conveying path is opened via an interlocking connection with the opening of the access door. As a result, it is easy to handle the jam of the sheet that takes place in the circulating conveying path. That is, it is possible to increase the efficiency of the jam handling operation.

(Second Embodiment)

Figure 6:
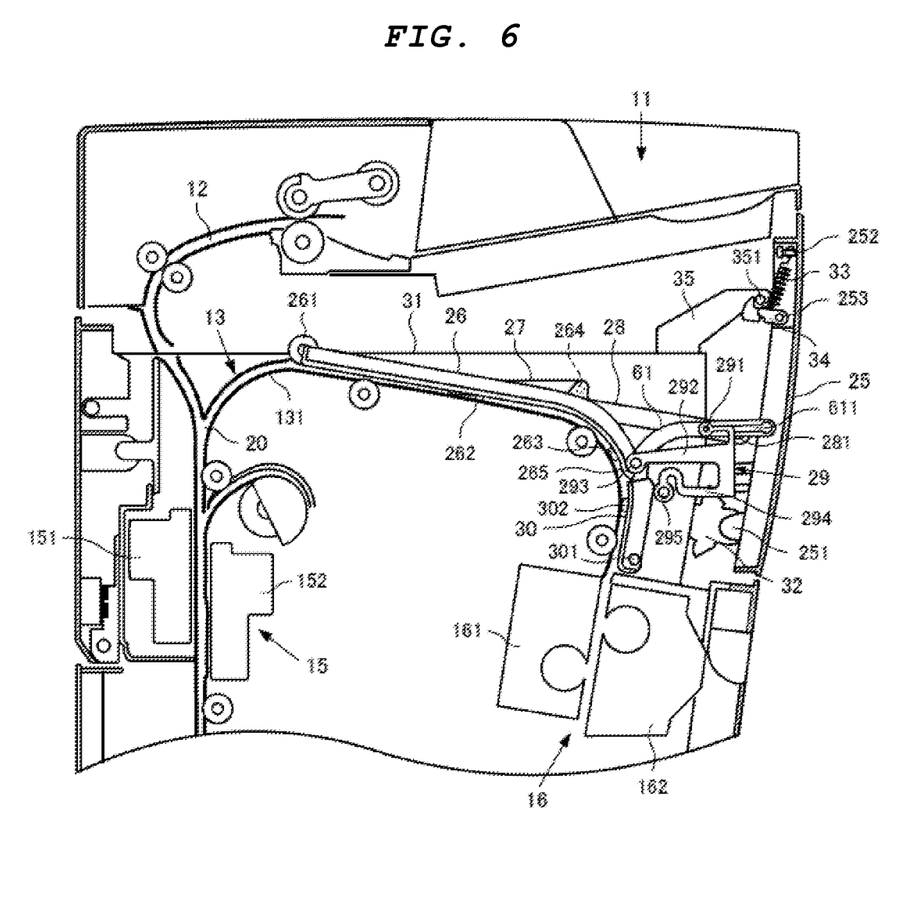
FIG. 6 is a schematic diagram illustrating a second embodiment of the sheet conveying apparatus.
Figure 7:
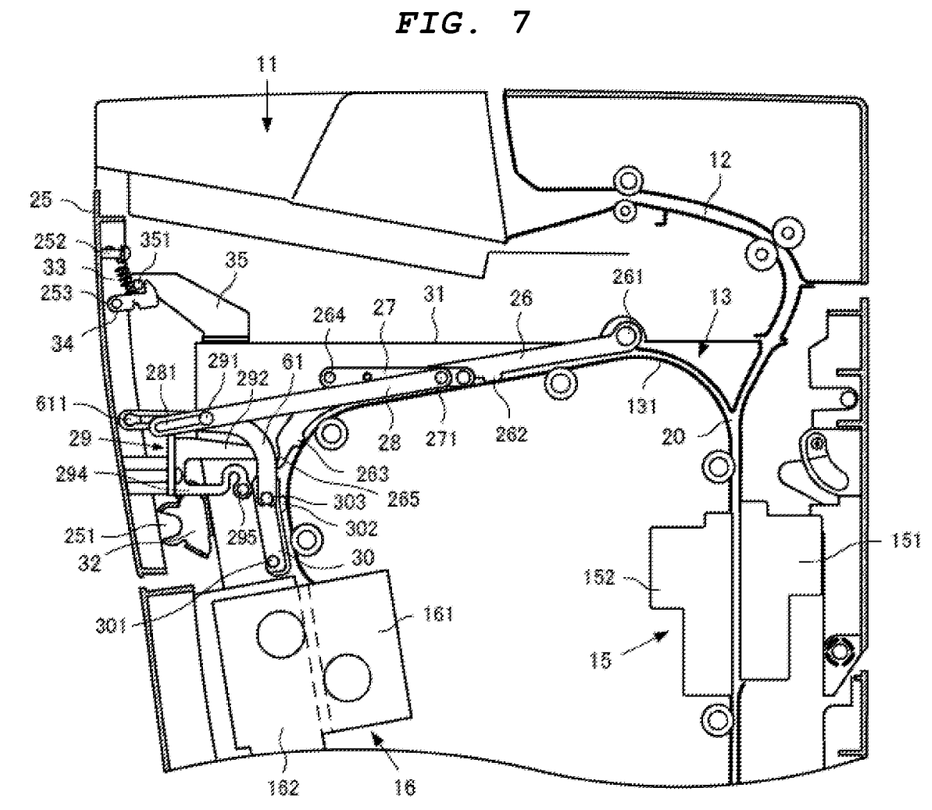
FIG. 7 is a back view of FIG. 6 in a state where the access door is closed.

In the following, with reference to FIGS. 6 and 7, the second embodiment of the sheet conveying apparatus will be explained. FIG. 6 is a front view corresponding to FIG. 2. FIG. 7 is a back view of FIG. 6. Here, the same reference numerals and letters as those used in describing the above in the first embodiment are used, so that explanations will be provided only for the different features.

According to this embodiment, the conveying guide 30 can be opened by interlocking with the opening of the access door 25 and in correlation to the opening of the upper side conveying guide 26. That is, the upper side conveying guide 26, that is positioned substantially perpendicular to the closed access door 25, and the conveying guide 30, that is positioned substantially parallel with the access door, are both released by an interlocking mechanism with the opening of the access door 25.

As shown in FIGS. 6 and 7, shaft 303 (FIG. 7) is attached on the conveying guide 30 at a position on the side opposite to the attachment position of the shaft 301. One end of a guide link 61, having a curved shape, is connected to the shaft 303 in a freely rotatable way. A slot 611 is formed on the other end of the guide link 61. The first arm 291 of the link arm 29 is engaged with the slot 611. The first arm 291 is also engaged with the slot 281 of the second link 28. The first arm 291 can slide in the slot 611 and the slot 281.

A monolithically formed link arm 29 includes the first arm 291, the second arm 292, and a third arm 294. A hole 295 is formed at the tip of the third arm 294. The tip of the third arm 294 provides an elastic force pressing the conveying guide 30 against the circulating conveying path 13 side.

Figure 8:
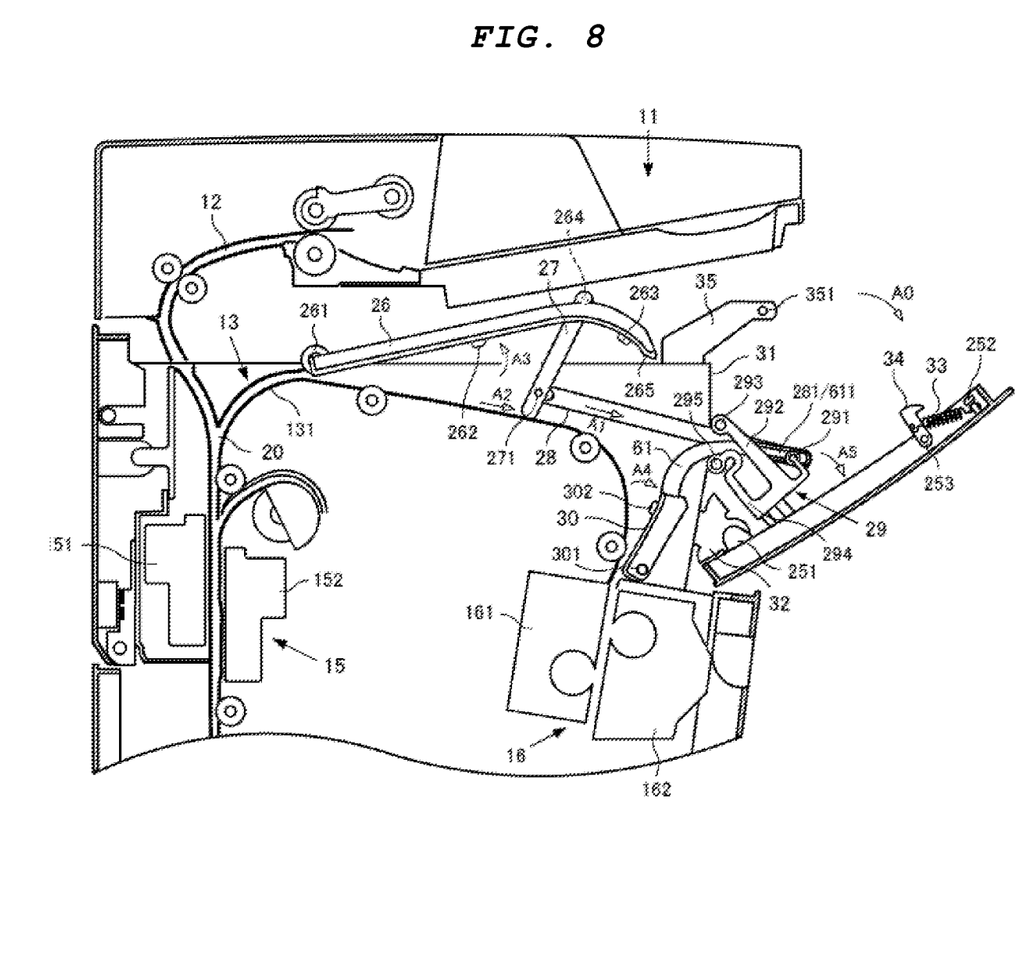
FIG. 8 is a front view of FIG. 6 in a state where the access door is opened.
Figure 9:
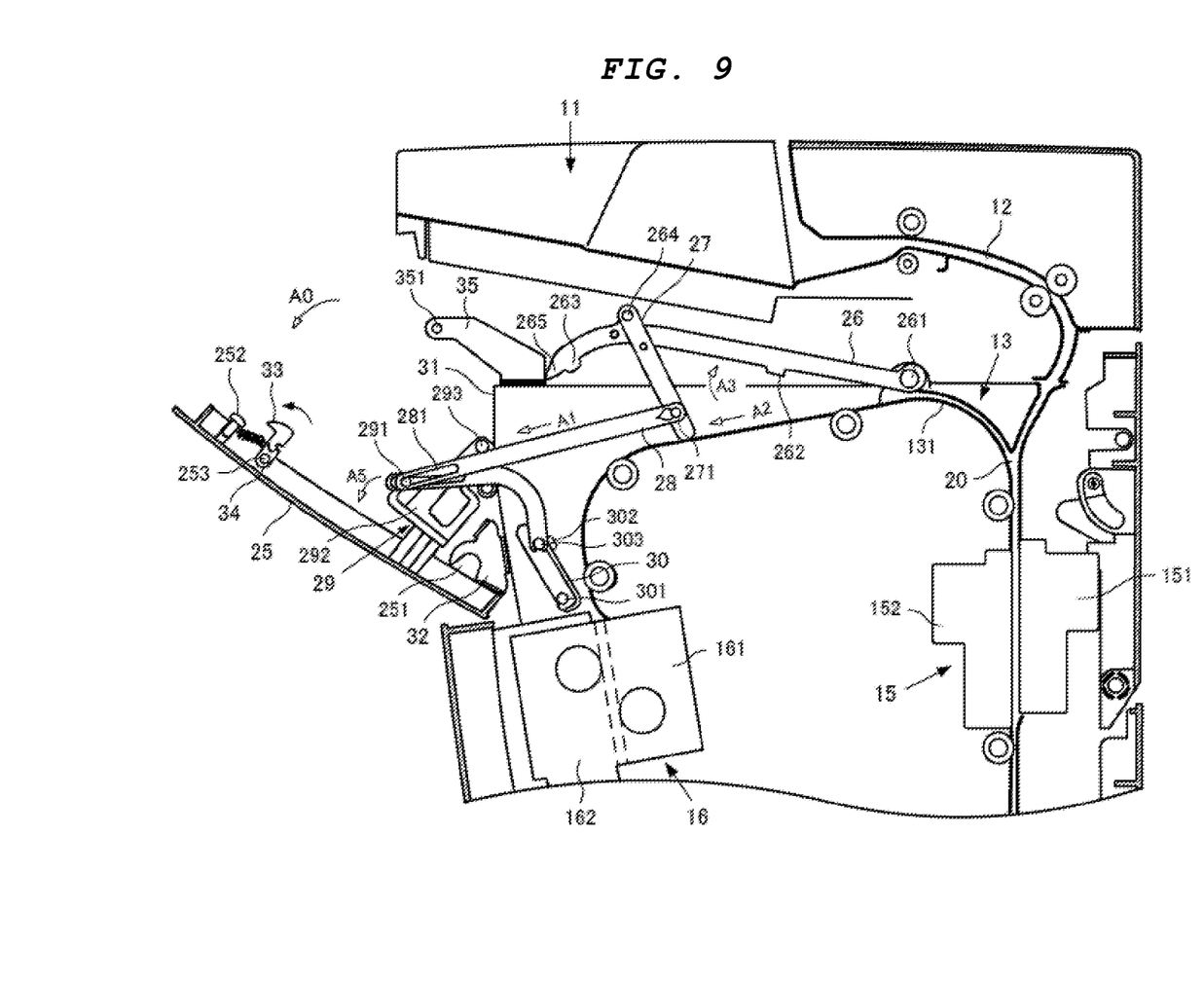
FIG. 9 is a back view of FIG. 8.

In the following, with respect to FIGS. 8 and 9, the operation of the second embodiment will be explained. FIG. 8 is a front view illustrating the state in which the access door 25 is closed from the state shown in FIG. 6. FIG. 9 is a back view of FIG. 8.

The lever interlocked with the key portion 34 is manipulated, so that the key portion 34 is driven to swing counterclockwise. The engagement of the key portion 34 with the locking shaft 351 is released, and the access door 25 is opened in the direction indicated by the arrow A0 as shown in FIGS. 8 and 9. In company with the opening of the access door 25, the first arm 291 of link arm 29, moves in the slot 281 of the second link 28. At the same time, the third arm 294 moves in the slot 611 of the guide link 61. During the period when the first arm 291 moves in the slot 281, the second link 28 does not move in the longitudinal direction. Additionally, during this period when the third arm 294 moves in the slot 611, the guide link 61 does not swing.

The first time period while the first arm 291 moves in the slot 281 and the third arm 294 moves in the slot 611 are different than the second time period for the opening operation of the upper side conveying guide 26 or the conveying guide 30. This difference is due to a lost motion connection formed by slot 281 and slot 611. The lost motion connection contributes to an improvement in the operability by decreasing the load on the operator opening the door caused by the second link 28 and the guide link 61 at the start of the opening operation for the access door 25. In addition, the lost motion connection also contributes to improvement of the performance of engagement/disengagement between the key portion 34 of the access door 25 and the locking shaft 351.

Accompanying with the movement of the link arm 29, the tip portion 265, of the upper side conveying guide 26, is released from the pressure by the second arm 292. At the same time, the guide link 61 is released from the pressure by the third arm 294.

As the access door 25 is further opened, the first arm 291 becomes in contact with the end of the slot 281 and the end of the slot 611, respectively in a contact state. As the access door 25 is further opened from this contact state, the second link 28 moves in the direction indicated by the arrow A1 as shown in FIGS. 8 and 9. The guide link 61 is driven to swing counter clockwise along a sector-shaped trace as indicated by an arrow AS shown in FIGS. 8 and 9.

As the second link 28 moves in the direction indicated by the arrow A1, the first link 27 is swung around a shaft 271, provided as an axis and connection with the second link 28. In company with the raising of the first link 27, the upper side conveying guide 26, connected to the first link 27 by the supporting portion 264, is swung in the direction indicated by the arrow A3 around the shaft 261 as shown in FIGS. 8 and 9. As a result, the upper side conveying guide 26 can be opened.

The conveying guide 30 is swung in the direction indicated by the arrow A4 about the shaft 301 as the guide link 61 is swung in the direction indicated by the arrow A5. As a result, the region for the opening of the circulating conveying path 13 becomes even wider.

In this way, the upper side conveying guide 26 arranged in a position substantially perpendicular to the access door and the conveying guide 30 arranged in a position substantially parallel with the access door 25 can be opened with only the opening operation of the access door 25. The circulating conveying path 13, from the shaft 261 of the upper side conveying guide 26 to the shaft 301 of the conveying guide 30, is opened as the upper side conveying guide 26 and the conveying guide 30 are opened. The opening operation of the access door 25, improves the process ability of paper jams which take place in the circulating conveying path 13 by providing a large open region for accessibility to the jammed paper.

According to this embodiment, opening operations can be simultaneously performed for the opening operation of the access door the upper side conveying guide that is arranged in the direction perpendicular to the access door and forms a portion of the upper side conveying path of the circulating conveying path, and the lower side conveying guide that is arranged substantially parallel with the access door and forms a portion of the circulating conveying path. As a result, in a single operation, it is possible to open the circulating conveying path in a wide region, so paper jams are handled with higher efficiency.

The present invention is not limited to the embodiments described above. The image erasing apparatus in the above explanation, as an example of the sheet conveying apparatus, discloses the image formed on the sheet is discolored by heating. However, this is merely an example. The present invention is not limited to this example. For example, it may be also possible to adopt the exemplary embodiments in any image forming apparatus in which the upper side conveying guide is arranged at a position substantially perpendicular to the access door.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet conveying apparatus, comprising:
   an access door having one end supported on the side surface of a main body;
   a conveying path through which a sheet is conveyed in a direction substantially perpendicular to the access door when the access door is in a closed position;
   a conveying guide, which has an end thereof located over the conveying path to form a portion of the conveying path, and another end thereof supported by a guide pivot; and
   a link member, which connects the conveying guide and the access door, and upon opening of the access door, swings the conveying guide about the guide pivot in a direction different from the opening direction of the access door to expose the conveying path otherwise overlain by the conveying guide.

2. The sheet conveying apparatus according to claim 1, wherein the link member includes a first link member, which has one side slidable on the conveying path and has the other side supporting the conveying guide to swing thereabout, and a second link member, which is arranged between the first link member and the access door, and by an interconnected relationship with the opening/closing of the access door, raises or lowers the first link member.

3. The sheet conveying apparatus according to claim 1, wherein the start of the swinging of the conveying guide is delayed from the start of the opening of the access door.

4. The sheet conveying apparatus according to claim 3, wherein the delay is provided by a slot formed in a second link member supporting a first link member, which has one side slidable on the conveying path and has the other side supporting the conveying guide to swing thereabout.

5. The sheet conveying apparatus according to claim 4, wherein when the access door is in the closed position, the conveying guide is biased in a closed direction by a link arm.

6. The sheet conveying apparatus according to claim 5 wherein an outer portion of the conveying path is formed by the conveying guide.

7. A sheet conveying apparatus, comprising:
   an access door having one end supported on the side surface of a main body to arcuately swing about a support location for the opening and closing thereof;
   a conveying path that conveys a sheet in a direction substantially perpendicular to the access door when the access door is in a closed position;
   a first conveying guide, which has an end thereof located on the upper side of the conveying path to form a portion of the conveying path, and another end thereof supported to swing about a first guide pivot;
   a second conveying guide, which has a first end thereof located over the conveying path to form a portion of the conveying path, and a second end thereof supported to swing about a second guide pivot;
   a curve shaped guide link having one side connected to the second conveying guide; and
   a link member, which connects the first conveying guide and the curve shaped guide link to the access door, and by interconnection with the access door, displaces the first conveying guide in an opposing direction from the arcuate swing direction of the access door and displaces the second conveying guide in the arcuate swinging direction of the access door, thus opening the conveying path formed by the first conveying guide and the second conveying guide.

8. The sheet conveying apparatus according to claim 7, wherein a beginning of the swinging of the first conveying guide and the second conveying guide is delayed from a beginning of the opening of the access door.

9. The sheet conveying apparatus according to claim 8, wherein the delay is provided by a sliding of a pin in a slot, whereby the first conveying guide and the second conveying guide remain stationary as the pin moves in the slot, and begin moving when the pin engages against an end of the slot.

10. The sheet conveying apparatus according to claim 9, wherein when the access door is in the closed position, the first conveying guide and the second conveying guide are biased in the closed position by the link member.

11. The sheet conveying apparatus according to claim 7, wherein the first guide pivot, for the first conveying guide, and the second guide pivot, for the second conveying guide, are pivotally supported at opposed ends thereof.

12. The sheet conveying apparatus according to claim 11, wherein an outer portion of the conveying path is formed by the first conveying guide and the second conveying guide.

13. A method for opening access to a conveying path on a sheet conveying apparatus having a housing with an access door configured to pivot about a hinge, the method comprising:
   providing a swingable first conveyance path guide, pivotable about a shaft and over a portion of the conveying path to guide an upper surface of a sheet conveyed therethrough;
   linking a movement of the swingable first conveyance path guide with the access door via a link member;
   swinging the access door about the hinge into an open position, causing the swingable first conveyance path guide to pivot about the shaft in a direction opposite to the swinging direction of the access door; and
   in response to the swingable first conveyance path guide pivoting about the shaft, providing access to the conveying path.

14. The method of claim 13, further comprising:
   interlocking with the swing of the access door a curve shaped guide link having one side connected to a second conveying guide wherein the second conveyance guide is pivotable about a second shaft; and
   displacing the second conveying guide, which forms a portion of the conveying path adjacent to the access door, thus providing additional access to the conveying path.

15. The method of claim 14, wherein while the access door is in a closed position, the first conveying guide and the second conveying guide are biased to a closed direction by the link member.

16. The method of claim 14, wherein a start of the pivoting of the first conveying guide and the displacing of the second conveying guide is delayed from a start of the opening of the access door.

17. The method of claim 16, wherein the delay is realized by a slot formed in the link member.

18. The method of claim 13, wherein the link member includes a first link member and a curved shaped guide link.

19. The method of claim 18, wherein the first link member has one side slidable on the conveying path and has the other side supporting the first conveying guide to swing thereabout, and a second link member, which is arranged between the first link member and the access door, and by an interconnected relationship with the opening or closing of the access door, raises or lowers the first link member.

20. The method of claim 18, wherein the curved shaped guide link is arranged between the second conveying guide and the access door, and by an interconnected relationship with the opening or closing of the access door, opens or closes the second conveying guide.

\* \* \* \* \*